UNITED STATES PATENT OFFICE.

FRITZ QUADE, OF BERLIN, GERMANY, ASSIGNOR TO THE FIRM OF JOHANN A. WÜLFING, OF BERLIN, GERMANY.

METHOD OF PRODUCING NON-HYGROSCOPIC ALBUMINOUS PREPARATIONS.

1,003,151.  Specification of Letters Patent.  Patented Sept. 12, 1911.

No Drawing.  Application filed July 7, 1910.  Serial No. 570,825.

*To all whom it may concern:*

Be it known that I, FRITZ QUADE, Doctor of Chemistry, a citizen of the Empire of Germany, residing at Berlin, in the Empire of Germany, have invented a new and useful Method of Producing Non-Hygroscopic Albuminous Preparations, of which the following is a specification.

My invention consists in a method of producing a monoalkaliglycerophosphate mixed with casein sodium, which preparation is useful both as a food and as a tonic.

I will now proceed to describe my invention.

The glycerin-phosphoric acid or its salts produced by the esterification of phosphoric acid or phosphates respectively is or are difficult to obtain in a good output and in a form easily to be dosed out for two causes, viz.: 1. During the esterification by-products are easily formed which hinder the crystallization. 2. The sodium salts are most hygroscopic, crystallize very slowly, and furnish, even if very pure solutions are employed, a pasty crystal-mass interspersed with syrupy constituents which mass is difficult of filtration.

It is only possible to prevent the formation of by-products, if, for example, sodium-metaphosphate in a finely divided state, is heated *in vacuo* with an excess of glycerin while preventing the temperature from exceeding 145° centigrade, whereby nearly the whole phosphate is esterified without forming pyroester and other defiling by-products by reason of the comparatively low temperature. However, it was impossible for the phosphate formed owing to its small crystallizing power to separate quantitatively from the reacting mixture containing an excess of glycerin obtained by the above method or by other similar methods. Also the addition of sodium in a quantity required for converting monoglycerophosphate into diglycerophosphate, that is in the form of sodium hydroxid, did not furnish the desired result.

I have discovered, that a quantitative separation of the formed mono-sodium glycerophosphate direct from the reacting mixture is rendered possible by the addition of casein-sodium, at best in alcoholic suspension, to the reacting mixture, and that thus a preparation is obtained which is useful both as a food and as a tonic. In this manner a product is formed which contains the entire quantity of esterified phosphate, while the excess in glycerin soluble in alcohol can be easily removed by filtration. The product formed does not show the pasty state of the pure glycerophosphate, even if it contain 20% and more of glycerophosphate, proves to be non-hygroscopic, can be easily dosed out, and possesses a taste far more agreeable than the pure salt.

I am aware, that it has already been proposed to render albumin soluble by means of disodium glycerophosphate already separated from the reacting mixture and freed in any known manner from the by-products, this pure disodium glycerophosphate serving for dissolving freshly precipitated coagulated milk, (casein).

The method according to my invention differs from the above method in that a reacting mixture containing mono-glycerophosphate obtained by esterification is at once employed. A second difference resides in the fact, that not freshly precipitated casein is rendered soluble, but an already soluble product, viz. the casein-sodium to be had as an article of commerce, is employed, which is simply to serve as a vehicle for the mono-sodium-glycerophosphate. In the present case a casein-sodium containing 1% sodium, acting neutral upon phenolphthalein is preferable. The proportion between the casein-sodium and the mono-sodium-glycerophosphate can be varied within wide limits, while invariably useful products are obtained. Non-hygroscopic products having useful properties can be produced up to a maximum percentage of about 25% of the mono-sodium-glycerophosphate. The reacting mixture serving as the raw material for this method can be produced in many various manners, and the quantity of casein-sodium to be added can be varied.

Following is an example: One part by weight of sodium-metaphosphate is dissolved in a just sufficient quantity of water and is heated *in vacuo* with three parts by weight of glycerin, whereby first the water is evaporated and then the phosphate in a finely divided state is separated in the glycerin. By increasing the temperature the entire phosphate will be dissolved and at a temperature of 145° centigrade the esterification will be finished. The mixture now serving as raw material for the new method is in its hot state mixed with a like volume of water, and the solution so obtained is allowed to cool, after which it is introduced into a suspension of 20 parts by weight of casein-sodium in 200 parts by weight of alcohol of 90% while agitating the mixture. After a digestion for half an hour at the temperature of the room the product formed is filtered and dried. The casein-sodium forms together with the sodium glycerophosphate a product, which is as insoluble in glycerin as in alcohol. As already explained, this product is freed from the excess of glycerin adhering to it by digesting with alcohol, and can then be separated without difficulty from the mixture of alcohol and glycerin by filtration, and finally drying. If use is made of casein-sodium containing 1% of Na., the product obtained, which contains the entire quantity of the esterized phosphate, will be soluble in cold water.

I claim—

1. The hereindescribed method of producing a non-hygroscopic albuminous preparation, which consists in mixing alkali phosphate with glycerin, heating the mixture in vacuo whereby the phosphate is separated in a divided state in the glycerin, increasing the temperature for dissolving and esterifying the phosphate, adding water to the mixture and allowing to cool, introducing the mixture into a menstruum containing casein-alkali while agitating the entire mixture, digesting the mixture, separating the product consisting of the combination of casein-alkali with alkali glycerophosphate by filtration from the mixture, and finally drying the product.

2. The hereindescribed method of producing a non-hygroscopic albuminous preparation, which consists in mixing alkali phosphate, water, and glycerin, heating the mixture in vacuo whereby the water is evaporated and the phosphate is separated in a divided state in the glycerin, further heating the mixture to a temperature of about 145° C. so as to dissolve and esterify the phosphate, adding water to the mixture and allowing to cool, introducing the mixture into a menstruum containing casein-sodium while agitating the entire mixture, digesting the mixture, separating the product consisting of the combination of casein-sodium with alkali glycerophosphate by filtration from the mixture, and finally drying the product.

3. The hereindescribed method of producing a non-hygroscopic albuminous preparation, which consists in preparing the raw material by dissolving alkali phosphate in water, adding glycerin to the solution, heating the mixture in vacuo for evaporating the water and separating the phosphate in a divided state in the glycerin, increasing the temperature for dissolving and esterifying the phosphate, then in mixing the mixture while still warm with water, allowing it to cool, introducing the mixture into an alcoholic suspension of casein-alkali while agitating the entire mixture, digesting the mixture, separating the product by filtration from the mixture of alcohol and glycerin, and drying it.

4. The hereindescribed method of producing a non-hygroscopic albuminous preparation, which consists in preparing the raw material by dissolving alkali phosphate in water, adding glycerin to the solution, heating the mixture in vacuo for evaporating the water and separating the phosphate in a divided state in the glycerin, increasing the temperature of the mixture to about 145° C. so as to dissolve and esterify the phosphate, adding water to the mixture and allowing to cool, introducing the mixture into a menstruum containing casein-sodium containing 1% of sodium while agitating the entire mixture, digesting the mixture, separating the product consisting of the combination of casein-sodium with alkali glycerophosphate by filtration from the mixture, and finally drying the product.

5. The hereindescribed method of producing a non-hygroscopic albuminous preparation, which consists in preparing the raw material by dissolving sodium-metaphosphate in water, adding glycerin to the solution, heating the mixture in vacuo for evaporating the water and separating the phosphate in a divided state in the glycerin, increasing the temperature for dissolving and esterifying the phosphate, then in mixing the mixture while still warm with water, allowing it to cool, introducing the mixture into an alcoholic suspension of casein-sodium while agitating the entire mixture, digesting the mixture, separating the product by filtration from the mixture of alcohol and glycerin, and drying it.

6. The hereindescribed method of producing a non-hygroscopic albuminous preparation, which consists in preparing the raw material by dissolving sodium metaphosphate in water, adding three parts of glycerin to the solution of sodium metaphosphate, heating the mixture in vacuo for evaporating the water and separating the phosphate in a divided state in the glycerin, increasing the temperature of the mixture to 145° C. so as to dissolve and completely esterify the phosphate, mixing the material in its hot state with about an equal volume of water, allowing the solution so obtained to cool, introducing the mixture into a menstruum containing casein-sodium while agitating the entire mixture, digesting the mixture, separating the product consisting of the combination of casein-sodium with sodium glycero-phosphate by filtration from the mixture, and finally drying the product.

7. The hereindescribed method of producing a non-hygroscopic albuminous preparation, which consists in preparing the raw material by dissolving sodium metaphosphate in water, adding three parts of glycerin to the solution of sodium metaphosphate, heating the mixture *in vacuo* for evaporating the water and separating the phosphate in a divided state in the glycerin, increasing the temperature of the mixture to 145° C. so as to dissolve and completely esterify the phosphate, mixing the material in its hot state with about an equal volume of water, allowing the solution so obtained to cool, introducing the mixture into a menstruum consisting of 20 parts casein-sodium suspended in 200 parts of 90% alcohol while agitating the entire mixture, digesting the mixture for about half an hour at the temperature of the room, separating the product by filtration from the mixture of alcohol and glycerin, and finally drying the product.

FRITZ QUADE.

Witnesses:
   MAX LEMCKE,
   LOUIS VANDORN.